Oct. 2, 1973 A. E. SOWERBY 3,763,208
USE OF AMINE COMPOUND IN THE SULFATION OF ALCOHOLS
Original Filed Feb. 26, 1968

United States Patent Office 3,763,208
Patented Oct. 2, 1973

3,763,208
USE OF AMINE COMPOUNDS IN THE
SULFATION OF ALCOHOLS
Austen Edgar Sowerby, Distington, England, assignor to
Electric Reduction Company of Canada Ltd., Toronto,
Ontario, Canada
Original application Feb. 26, 1968, Ser. No. 708,191.
Divided and this application Oct. 19, 1970, Ser.
No. 82,099
The portion of the term of the patent subsequent to
Dec. 29, 1987, has been disclaimed
Int. Cl. C07c 141/10
U.S. Cl. 260—458                                    18 Claims

ABSTRACT OF THE DISCLOSURE

A process for sulphating materials having free OH groups such as primary, secondary, and tertiary alcohols and alkylene oxide condensates of alcohols or phenols which comprises reacting the said sulphatable material with sulphur trioxide in the presence of a further product obtained by the action of an amino compound on the product obtained from the sulphation reaction. At most only a small excess of sulphur trioxide is employed and mild conditions are maintained throughout the reaction.

---

Figure 1:
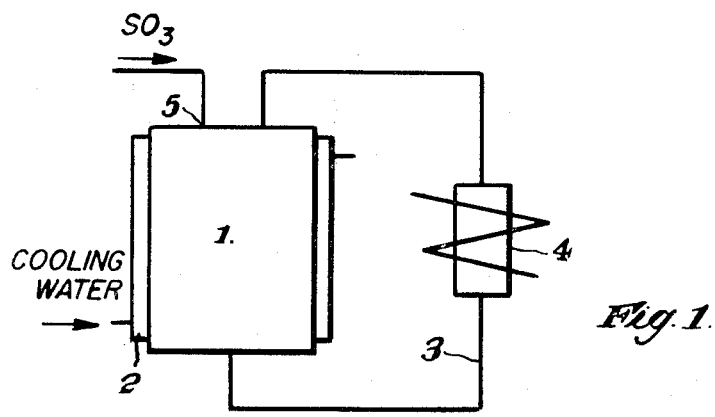

This application is a division of my copending application Ser. No. 708,191 filed Feb. 26, 1968 which issued as Pat. No. 3,551,460 on Dec. 29, 1970.

The present invention relates to a new method for using sulphur trioxide in the sulphation of alcohols. Sulphation produces a carbon-oxygen-sulphur (C—O—S) linkage.

Many of the sulphation products of the compounds treated in the process of the invention are widely used in detergent compositions. However, if high yields of the products are to be obtained in sulphation processes using sulphur trioxide, it has hitherto been necessary to use rather complex methods because of the difficulty of obtaining 100% conversion of the organic material. There have in recent years been several proposals for improving the yields of sulphation reactions using sulphur trioxide which have involved the design of special and elaborate reaction vessels and typical of these is the one for sulphating fatty alcohols and alkaryl hydrocarbons described in U.S. Pat. No. 3,199,960.

It is an object of the invention to provide a process of sulphation using sulphur trioxide as the sulphating agent, which can be carried out in simple and conventional reaction vessels although more complex systems may be used if desired. This object has now been achieved by adding to the product of the sulphation reaction an amino compound capable of forming a further product with the sulphated organic compound which product is preferably a liquid or is soluble under the conditions of the reaction. This addition can be carried out either in the sulphation reaction vessel or in a separate reactor with re-cycling of the further product into the sulphation reaction mixture.

Accordingly from one aspect the present invention provides a process for the production of sulphated organic compounds, as hereinbefore defined, which process comprises; (1) adding free sulphur trioxide to a sulphatable organic compound liquid under the conditions of the reacting and (2) reacting at least some of the product from stage 1 with an amino compound capable of forming a further product therewith, this reaction being carried out in a manner such that at least part of the process of stage 1 is carried out in the presence of some of this further product. Preferably, the product from stage 2 is subsequently reacted with a stronger base than the amino compound used in stage 2 in order to obtain a salt of the sulphated organic compound, the amino-compound being thus liberated for re-use.

Compounds which may be sulphated by the process of the invention include: primary and secondary saturated and unsaturated aliphatic hydrocarbon alcohols, in particular those having from 8 to 26 carbon atoms such as for example, octanol, lauryl alcohol, stearyl alcohol the mixtures of alcohol known as coconut alcohols and tallow alcohols, oleyl, and cetyl alcohols. As alcohols there may also be mentioned condensates of alkylene oxides, particularly ethylene and/or propylene oxides, with alkylphenols or saturated or unsaturated aliphatic hydrocarbon alcohols having from 8 to 26 carbon atoms, for example those having from 3–6 alkylene oxide groups such as nonyl phenol condensed with 4 moles of ethyelne oxide, lauryl phenol condensed with 3 moles of ethylene oxide or hexa-decaphenol condensed with 5 moles of propylene oxide.

The organic material to be sulphated will either be itself liquid under the conditions of the reaction, or may be so rendered by introducing it to the reaction vessel in the form of a solution in a solvent which is not itself sulphated under the conditions of the reaction. A low boiling solvent is preferably used to simplify its removal from the sulphated product and suitable solvents are paraffin hydrocarbons, particularly the low boiling paraffins (sometimes termed petroleum ethers), such as butane and pentane. When the material to be sulphated is fed into the reactor in the form of a solution, the solvent may be stripped from the sulphated product after this has been removed from the reaction vessel. If a low boiling solvent is used, as is highly preferred, this may be stripped by distillation, which for convenience may be carried out under reduced pressure. However, if a high boiling solvent is used this may be extracted by means of solvent extraction techniques and if there is a neutralisation stage required in order to obtain the desired product, the solvent extraction stage may conveniently be carried out after such neutralisation.

The process of the invention is particularly suitable for obtaining a good overall yield of alkyl sulphates from the reactions of secondary alcohols with sulphur trioxide. It has now been found that when the process is used for the sulphation of olefines, or unsaturated alcohols, the proportion of undesired products resulting from polysulphation reactions is diminished and that, when used for sulphating alkyl phenol/alkylene oxide condensates, it promotes sulphation at the hydroxyl group rather than substitution of the aromatic nucleus.

It is highly preferred that the amino-compounds for use in the process of the present invention will form a liquid product with the sulphated organic product or will form a product that is soluble in the reaction mixture. It is also preferred that the amino compounds used have one or more of the hereinafter stated properties. Firstly, a complex with sulphur trioxide stable under the reaction conditions should not be formed since should this occur, it may be necessary to introduce a maturing step to enable the complex to break down and so allow the sulphation to be carried out with free sulphur trioxide. Secondly, if the desired final product is not a salt of the amino compound employed the amino-compound added should be reasonably volatile so that it can be easily distilled from the reaction mixture without having to use elaborate techniques, such as counter current extraction. Thirdly, the addition of the amino-compound should not cause such a rise in the viscosity of the sulphation reaction mixture as to make the agitation of the reaction mixture difficult. Hence the choice of amino-compound to be used will often be dependent upon the compound being sulphonated. Thus, for example, whilst ammonia is generally not preferred, as a result of the insolubility of ammonium salts, it may be used if the compound to be sulphated is one giving a soluble ammonium salt of its sulphonate, for instance glycol ethers such as a saturated primary alcohol condensed with from 1 to 3 moles of ethylene oxide.

The compounds which are of particular use as amino-compounds in the process of the invention are primary, secondary and tertiary aliphatic amines, heterocyclic amines, such as pyridine or morpholine, or ammonia itself. Preferred compounds are the low boiling aliphatic amines e.g. alkyl amines having 1 to 3 carbon atoms in each alkyl group, such as methylamine, ethylamine, isopropylamine, dimethylamine, diethylamine, di-isopropylamine, trimethylamine and triethylamine. The amines may contain inert substituents, but hydroxylic and carboxylic substituents are usually to be avoided because of their low volatility and because of the reactivity of such substituents towards sulphur trioxide. Among aromatic amines of use in the process are aniline and substituted anilines such as monomethyl and dimethyl aniline.

The amount of amino-compound to be added in order to obtain the optimum effect by using the process of the invention depends upon the conditions which are desired for the sulphation which in turn is often dependent upon the nature of the compound being sulphated. The reaction conditions may be modified according to the nature of the organic material being reacted with sulphur trioxide by increasing or reducing the proportion of amino-compound present. The most severe reaction conditions are obtained when only a small amount of amino-compound, say 10% of that required to react with the amount of sulphated organic compound present, is added. Conversely, the reaction conditions which exist when the amount of amino-compound added is sufficient to react with from 40 to 100% of the sulphated organic compound present are particularly mild and suitable for the sulphation of secondary alcohols and unsaturated alcohols. In any particular instance the optimum amount of amino-compound may readily be found by a few simple experiments.

If desired, however, the amount of amino-compound added may be sufficient to react completely with the sulphated organic compound present and with any excess sulphur trioxide employed in, or sulphuric acid produced by, the reaction. By this means a completely neutral reaction product is obtained which is mostly the amine salt of the sulphated organic compound. When some smaller amount of amino-compound is added there is then obtained a mixture of the free sulphonated organic compound and its salt with the amino-compound.

To obtain an amine salt of the sulphated product, that amine may be used as the said amino-compound in the process of the invention and the product for stage 2 then completely neutralized, if necessary, with a further amount of the amine.

The sulphur trioxide to be used as the sulphating agent in the process of the invention will normally be used in the form of a pure gas or mixed with an inert gas diluent, such as dry air, nitrogen, sulphur dioxide or carbon dioxide, the proportion of sulphur trioxide in this gas mixture usually being from 1–20%, preferably in the range 2–8% by volume, frequently it is about 5% by volume. The sulphur trioxide can, if desired, be fed in as a gas without any diluent, but it is then much preferred that the reaction mixture is kept under a subatmospheric pressure, for example less than 4 p.s.i., preferably in the range 0.3 to 2.0 p.s.i. A further form in which the sulphur trioxide may be added is as a solution in an inert solvent, such as liquid sulphur dioxide, methylene chloride, carbon tetrachloride, butane, pentane or a member of the Freon group, in such a case the sulphur trioxide is usually present in the solution to the extent of from 1–20%, preferably from 2–10%, by weight. The sulphur trioxide can also be used in the form of a pure liquid, the other reactant and the product acting as a diluent. The total amount of sulphur trioxide to be added, is preferably substantially the amount required to achieve the desired degree of sulphation of the sulphatable organic compound. This will generally be a slight stoichiometric excess of sulphur trioxide over the organic compounds to be sulphonated, for example up to a 30% molar excess of sulphur trioxide.

If gaseous sulphur trioxide is used in an inert gas diluent this can be introduced at pressures of from 0.03 to 1.3 atmospheres at a temperature in the range of about 10 to 110° C., preferably in the region of 40° C., although other temperatures and pressures may be used should this be found desirable in a particular case. If sulphur trioxide is dissolved in liquid sulphur dioxide, it is preferred to effect this introduction under pressure, in order to maintain the sulphur dioxide in the liquid state, although in some cases it may be possible to maintain this liquid state by cooling if the sulphatable compound has a sufficiently low melting point. In any case if the sulphur trioxide is introduced at the bottom of the reaction vessel, as is often the case, it will be necessary for it to be under sufficient pressure to overcome the hydrostatic pressure due to the reaction mixture in the vessel.

The temperature of the reaction vessel during the sulphation stage will be such as to keep the compound to be sulphated as a liquid. Normally it is preferred to keep the temperature within a few degrees of the lowest temperature at which this is possible and for this purpose it is often convenient to fit the reaction vessels used with cooling jackets and/or an internal cooling system.

If the sulphur trioxide is added to the organic material in a gaseous form it is often desirable to degas the product after extraction from the sulphation reaction system. This may be carried out in any conventional manner but it has been found convenient to use a centrifugal separation. If the sulphur trioxide or the organic material is added dissolved in a solvent it is convenient to remove the solvent by distillation.

Obviously the process of the invention may be carried out in a number of ways. There can be used either a continuous or a batch process, although for commercial reasons the former will normally be preferred, and both of these can be carried out in either a single or a multistage reaction vessel. If a single vessel is used in a batch process it is preferred not to start adding the amino-compound until after some of the organic compound has been sulphated.

A process of this type may be described with reference to FIG. 1 of the accompanying drawings. The apparatus used consists of a reaction vessel 1, having a cooling jacket 2, and a recycle loop 3, passing through a condenser 4. In operation cooling water is passed through a cooling jacket 2, and the condenser 4. Sulphur trioxide in whatever form is desired is fed into the reactor 1, through the inlet 5, wherein there is already present the compound to be sulphated. Some of the product of this reaction is taken off by the recycle loop 3, and the amino-compound is introduced to it. The resultant mixture containing the further product for the aforesaid stage 2 is then passed through the condenser 4, and returned to the reaction vessel 1.

Figure 2:
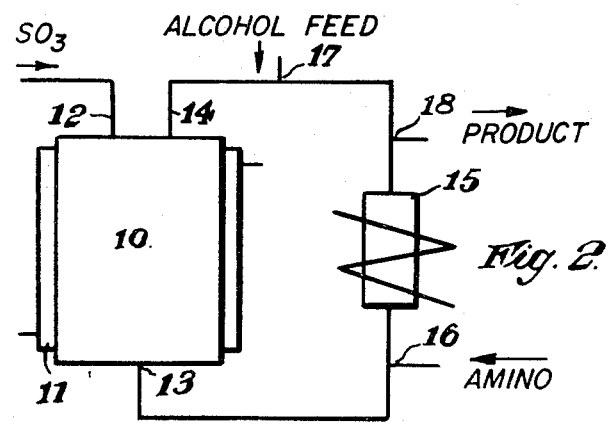

In the case of a reaction vessel operated on a continuous basis it is preferred to add the amino-compound at a point down-stream from the point of introducing the sulphur trioxide and the sulphatable compound. A simple reaction vessel which can be used for operating on a continuous basis is described with reference to FIG. 2 of the accompanying drawings. The reaction system consists of a reaction vessel 10 fitted with a cooling jacket 11, an inlet pipe 12, an exit to a recycle loop 13, and an inlet from the recycle loop 14, the recycle loop passes through a condenser 15, and has fitted to it two inlets 16 and 17, and an outlet 18. In operation cooling water is passed through the cooling jacket 11 and the condenser 15. Sulphur trioxide is fed into the reaction vessel 10 by means of the inlet 12 and the organic compound to be sulphated is fed into the recycle loop through the inlet 17 and thence through the inlet 14 to the reaction vessel 10. The product from the reaction vessel is taken through the outlet 13 to the recycle loop and to it is introduced the amino-compound through the inlet 16; the product obtained from the partly sulphated compound withdrawn into the recycle loop and the introduced amine is then passed through the condenser 15. Some of the product will be taken off by the outlet 18 and the remainder will pass back to the reaction vessel 10 via the inlet 14, more organic compound having been introduced through the inlet 17 on the way.

Figure 3:
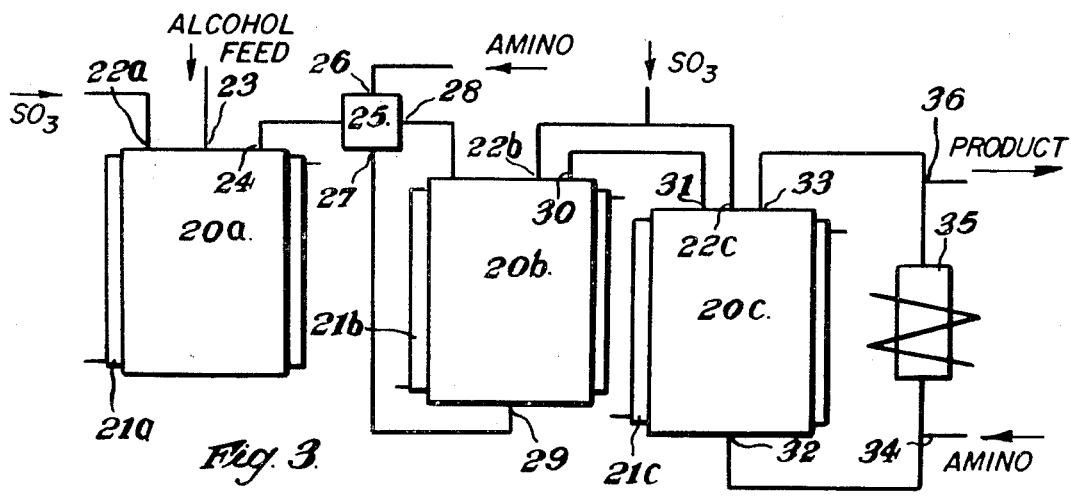

In order to obtain a more efficient utilisation of the sulphur trioxide used it may be desirable to use a multistage process. In simple multistage processes while the organic compound is caused to flow through a succession of vessels it is reacted in each with sulphur trioxide and the amino-compound may conveniently be introduced to the partly sulphated product as it flows from one vessel to the next. A reaction system of this type may be described with reference to FIG. 3 of the accompanying drawings. The system consists of three reaction vessels 20a, 20b, 20c each fitted with a cooling jacket 21a, 21b, 21c and an inlet 22a, 22b, 22c. In addition the first reactor 20a is fitted with a second inlet 23 and an outlet 24 leading to a mixed 25 which is fitted with an inlet 26, and an inlet 27 connected to the bottom of the second reaction vessel 20b, and an outlet 28, leading to the top of the second reaction vessel 20b. The second reaction vessel is fitted, in addition to the inlet 22b, with an outlet 29, which leads to the mixer 25 via the inlet 27, and an outlet 30 leading to the third reaction vessel 20c via the inlet 31. The third reaction vessel is fitted, in addition to the inlet 22c, with an outlet 32 leading to a recycle loop which returns to the third reactor via the inlet 33. The recycle loop passes through a condenser 35 and is fitted with an inlet 34 and an outlet 36. In operation cooling water is passed through the cooling jackets 21a, 21b, 21c and the condenser 35; sulphur trioxide is introduced to each of the reactors, 20a, 20b, 20c through the inlets 22a, 22b, 22c, the compound to be sulphated is introduced to the first reactor through the inlet 23 and the product of this reaction passes to the mixer via the outlet 24, the desired amino compound is introduced to the mixer via the inlet 26 and the product from this step passed into the second reactor 20b via the outlet 28. Part of the product from the second reactor 20b, is passed via the outlet 30 to the inlet 31 in the third reactor 20c and part is recycled via the outlet 29 to the inlet 27 of the mixer 25. The product from the third reactor is taken via the outlet 32 to the recycle loop and to it is introduced more amino-compound via the linet 34. The product is then passed through the condenser 35 and some of the product (which is arranged to be virtually pure amine salt of the sulphated compound) taken off through the outlet 36, the remainder being returned to the third reaction vessel, 20c via the inlet 33.

Although as previously stated it is intended to provide means of carrying out reactions in simple and conventional vessels the process of the invention is equally adaptable to more complex systems. It may for example be employed to advantage in multistage systems such as these described in U.S. Pat. No. 3,199,960 where sulphur trioxide is added in increments along the reaction path. In processes of this type according to the present invention, however, sulphur trioxide is added to alternate reaction zones only and into the remaining zones there is introduced sufficient amino-compound to react with all, or a proportion of, the sulphated product that has so far been formed.

It may be wished to terminate the process at this point and to use the amine salt so obtained or a mixture of the amine salt with the free sulphated compound and if this is so the desired product can be extracted at this point. If desired, the free sulphonic acid derivative can be obtained at this stage or, as is usually preferred, the amino salt may be converted into the salt of some other base, such as the salt of an alkali metal or an alkanolamine. The product at this stage will be a mixture of the free sulphated compound and its salt with the amino-compound used. In many cases the process will have been carried out in such manner that the product of this stage is almost completely neutralised by the amino-compound. In order to convert this product to the desired salt, the free sulphonic acid must be neutralised and the amino salt caused to undergo cation exchange. In order to effect the latter the base chosen must be one that has a greater basic strength than the amino-compound used. It is frequently desired to obtain the alkali metal salt of the sulphated compound and this can most conveniently be obtained by the addition of a solution of the desired alkali, say caustic soda, of a strength of from 25% to 60% by weight, preferably from 35% to 45% by weight, the amount of alkali added being sufficient to react with all the sulphated product.

The method for recovering the liberated amino-compound will depend upon its nature and boiling point. If, as is much preferred, it is an amine of low boiling point, it can be recovered by simple distillation whereas if a high boiling point amine or other high boiling amino-compound has been used there will usually need to be employed such techniques as counter-current or some other form of solvent extraction.

The neutralised sulphated product is then sold either in concentrated solution, optionally mixed with other surface active agents or other additives, or it is sold in flake form normally after having been drum dried or in the form of a powder after having been spray dried, the drying having been carried out either on the salt of the sulphated product by itself or on it as a component of a mixture suitable for use as a detergent optionally mixed with other adjuvants. However, in the case where all of the sulphated compound is converted to its amino salt it may be desired to sell this amino salt in some desired form without having carried out any further neutralisation or cation exchange stage.

The process of the invention is illustrated by the following examples:

EXAMPLES 1 TO 6

In Examples 1 to 6 the apparatus used was similar to that described above with reference to FIG. 1 but was modified by the incorporation of a sampling point in the re-cycle loop downstream of the the heat exchanger 4. The reaction vessel 1 was fitted with an exhaust gas vent and an agitator, the inlet 5 was in the form of a sparge pipe and this was connected to a sulphur trioxide generator which supplied a mixture of sulphur trioxide and dry air containing 5% by volume of sulphur trioxide.

In Examples 1 to 6 the reaction vessel was charged with sulphatable raw material, the nature of which is shown in Table 1 and the agitator started. The recycle pump was switched on so that the material in the reaction vessel circulated through the heat exchanger in the recycle loop and returned to the reaction vessel. The reaction mixture was kept at the desired temperature by passing water through the cooling hacket. A stream of sulphur trioxide from the generating apparatus was fed into the reaction vessel through the sparge pipe, the period of addition of $SO_3$ and the amount employed relative to the sulphonatable material is shown in Table I. Five minutes after the addition of sulphur trioxide was commenced a metered stream of amino-compound was continuously introduced by means of a proportionating pump to the entry point in the recycle loop. The rate of addition of the amino-compound was so regulated that the pH of a 1% aqueous solution of the reaction product withdrawn from the recycle loop downstream from the point of addition of the amine was in the range 5.0–6.0. The nature of the amino compound and the period for which it was added in each case are shown in Table I.

EXAMPLES 1-6

| Number of Ex. or Experiment | Organic material employed | Time of addition of $SO_3$, minutes | Overall molar ratio of $SO_3$:organic material | Amino compound employed | Time of addition of amino compound, minutes | Reaction temperature, °C. | Nature of product |
|---|---|---|---|---|---|---|---|
| Ex. 1 | Commercial $C_{13}$–$C_{17}$ secondary alcohols having M.W. 221. | 95 | 1.1:1.0 | Triethylamine | 95 | 35 | 94% triethylamine salt of sulphated $C_{13}$–$C_{17}$ secondary alcohols; 4.65% triethylamine salt of $H_2SO_4$. |
| Ex. 2 | do | 98 | 1.1:1.0 | Isopropylamine | 98 | 40 | 90% isopropylamine salt of sulphated $C_{13}$–$C_{17}$ secondary alcohols; 6.41% isopropyl amine salt of $H_2SO_4$. |
| Ex. 3 | Commercial oleyl alcohol | 95 | 1.2:1.0 | Triethylamine | 98 | 30 | 92.6% sulphated having 20% of double bond sulphated. |
| Ex. 4 | do | 87 | 1.2:1.0 | Monoisopropyl amine. | 90 | 35 | 91.3% sulphated having 73% retention of double bond. |
| Comparative Experiment 1. | Commercial oleyl alcohol | 90 | 1.2:1.0 | | | 35 | 85.3% sulphonated having 57.6% sulphonation of double bond. |
| Ex. 5 | Nonyl phenol condensed with 4 moles of ethylene oxide. | 70 | 1.3:1.0 | Triethylamine | 72 | 50–55 | 96.7% sulphated having a ring sulphonation of 6.15% on 100% active basis. |
| Comparative Experiment 2. | Nonyl phenol condensed with 4 moles or ethylene oxide. | | 1.3:1.0 | | | 50 | 91.3% sulphated having a ring sulphonation of 14% on 100% active basis. |
| Ex. 6 | Commercial $C_{13}$–$C_{17}$ secondary alcohols having M.W. of 221. | 105 | 1.1:1.0 | Equimolar complex of triethylamine and $SO_2$. | 105 | 35 | After neutralisation with a little triethylamine: 96.8% yield of triethylamine salt of secondary alcohol sulphate. |

EXAMPLE 7

In the first stage of a two-stage batch sulphation process, $C_{14}$–$C_{15}$ secondary alcohols were sulphated at a reaction temperature of 30° C. with 55% of the stoichiometric proportion of $SO_3$ in the form of a 5 vol. percent mixture with dry air. The partially sulphated reaction product was neutralised by the addition of the requisite amount of triethylamine and the sulphation was then completed by the addition of a further 0.65 gm. moles of $SO_3$ per gm. mole of alcohol. The reaction product was neutralised by the addition of triethylamine to give a 95.8% yield of the triethylamine salt of the sulphated secondary alcohols.

COMPARATIVE EXPERIMENT NO. 3

A commercial $C_{13-17}$ seconary alcohol having an iodine value of 5.0 was sulphated in a batch reactor at a temperature of 35° C. with the amount of sulphur trioxide theoretically required to react with all of the alcohol, in the form of a 5 vol. percent mixture with a dry air stream. After neutralising the reaction product wih aqueous caustic soda a 52% yield of alkyl sulphate, calculated on the starting weight of alcohol was obtained. The unreacted organic matter, which was recovered from the neutral product by extraction with petrol, had an iodine value of 30, showing that excessive dehydration of the secondary alcohol had occurred during sulphation. The recovered unreacted organic matter was saponified by heating it with aqueous caustic soda at 80° C. for six hours and then extracted again with petrol, to recover the unsaponifiable matter. The aqueous layer from this second extraction was found to contain sodium alkenyl sulphonate formed by the dehydration and sulphonation of 16.3% of the starting alcohol. Thus, under the reaction conditions employed 68.3% of the secondary alcohol had reacted to yield a mixture comprising 76% of alkyl sulphates and 24% of alkenyl sulphonates.

EXAMPLE 8

Cetyl-oleyl alcohols from Sperm oil were sulphated in the apparatus and by the method described in Examples 1 to 6 while an accurately metered stream of monoisopropylamine was introduced to the recycle loop. The following conditions were employed:

| | |
|---|---|
| Time of addition of $SO_3$ minutes | 90 |
| Time of addition of isopropylamine do | 93 |
| Reaction temperature ° C | 40 |
| $SO_3$ concentration in air stream vol. percent | 5 |
| Molar ratio $SO_3$:alcohol | 1.2:1.0 |

An analysis of the neutralised product showed that 98.2% of the alcohols had been converted to detergent-active substances and that double bond retention was 80%. The product was converted to its sodium salt by addition of 105% of the stoichiometric proportion of sodium hydroxide and heating the mixture to 100° C. to distil out the amine.

COMPARATIVE EXPERIMENT 4

Cetyl-oleyl alcohols from Sperm oil were sulphated at 40° C. with 1.3 gm. moles of $SO_3$ per gm. mole of alcohol and the reaction product was neutralised with a mixture of aqueous NaOH and ethanol. The neutralised product was dried by heating gently on an open tray and then in a 60° C. oven to obtain an anhydrous product. Analysis of the product showed that 92.4% of the alcohols had been converted to detergent-active matter but that the double-bond retention was only 49.6%.

The importance of avoiding attack on the double bond in the sulphation of unsaturated alcohols is illustrated by comparative plate-washing tests performed on the products of Comparative Experiment No. 4 and Example 8. To eliminate the influence of unreacted alcohol upon the performance of the detergent samples they were first purified by extraction with petroleum ether. The tests were made in both soft (10 p.p.m. hardness) and hard (300 p.p.m. hardness) water using 2 gm./litre of 20% active detergents.

| Sample | Percent double-bond retention | Number of plates washed | |
|---|---|---|---|
| | | Soft water | Hard water |
| Example 8 | 80 | 21 | 10 |
| Experiment 4 | 49.6 | 4 | 3 |

EXAMPLE 9

A batch reaction vessel was charged with 250 gms. of the triethylamine salt of sulphated tallow alcohols containing 90.7% of detergent and 2.1% of unreacted alcohol, and 140 gms. of $C_{14}$–$C_{15}$ secondary alcohols having an average molecular weight of 205. The mixture was agitated vigorously and 65.6 gms. of $SO_3$ (1.2 moles: mole of secondary alcohol) was introduced through the sparge pipe of the vessel in the form of a 5 vol. percent mixture with dry air over a period of fifty minutes. The reaction temperature was regulated in the range of 55° C.–60° C. by circulating cooling water through the jacket of the vessel. Upon completion of the addition of sulphur trioxide the reaction product was neutralized by the addition of 82 gms. of triethylamine to obtain a 95.3% yield of the triethylamine salts of a mixture of tallow alcohol sulphate and secondary alkyl sulphate. This mixture when subsequently converted to its sodium salt by base exchange and incorporated in a heavy-duty detergent powder formulation was found to have good detergency and foaming properties.

perature in the reaction vessel was controlled by passing cooling water through a jacket on the reaction vessel.

The results of the examples are shown in Table II.

TABLE II

| Ex. No. | Nature of sulphatable material | Amino compound employed | Molar ratio of amino compound sulphatable material | Period of addition of $SO_3$, minutes | Overall reaction ratio of $SO_3$:sulphonatable material | Reaction temperature, °C. | Nature of product after neutralisation with triethylamine |
|---|---|---|---|---|---|---|---|
| 12 | $C_{14}$–$C_{15}$ secondary alcohols having M.W. of 204. | Triethylamine alkyl benzene sulphonate having M.W. of 426. | 1.0:1.0 | 45 | 1.3:1.0 | 40–45 | 91.6% detergent active substances and 1.3% free oil. |
| 13 | Tallow alcohols having an average M.W. of 256. | ---do--- | 1.0:1.0 | 45 | 1.3:1.0 | 40–45 | 89.5% detergent active substances and 1.56% free oil. |
| 14 | Commercial oleyl alcohol having an average M.W. of 262. | ---do--- | 1.0:1.0 | 45 | 1.3:1.0 | 40–45 | 92.6% detergent active substances and 2.24% free oil. |
| 15 | Commercial sperm oil alcohols having an average M.W. of 254. | ---do--- | 1.0:1.0 | 45 | 1.3:1.0 | 40–45 | 97% detergent active substances and 1.39% free oil. |

EXAMPLE 10

A charge of 768 gms. tallow alcohol substrates (3 gm. moles) in a batch reaction vessel was partially sulphated at a temperature of 60° C.–65° C. by the addition of 120 gms. (1.5 gm. moles) of sulphur trioxide in the form of a 5 vol. percent mixture with dry air over a period of 30 minutes, after which the reaction mixture was neutralised by the addition of 152 gms. of triethylamine. In the second stage of the process the sulphation was completed by the addition of a further 145 gms. (1.8 gm. moles) of sulphur trioxide and the reaction mass was then neutralised by the addition of 182 gms. of triethylamine. The neutral product contained 90.7% of the triethylamine salt of sulphated tallow alcohols and 2.1% of unreacted alcohol, equivalent to a conversion of 96.2% of the alcohol charged.

EXAMPLE 11

A mixture of 200 gms. of commercial lauryl alcohol and 560 gms. of lauric isopropanolamide was charged to a batch reaction vessel, heated to 50° C. and vigorously agitated. Into this mixture was then introduced through the sparge pipe of the vessel a total of 270 gms. of sulphur trioxide in the form of a 5 vol. percent mixture with dry air, while maintaining the reaction temperature in the range of 55° C.–60° C. by means of cooling. The sulphation reaction was carried out in four separate stages, adding 67.5 gms. of $SO_3$ in each stage. After each stage the reaction mixture was neutralised by the addition of triethylamine to obtain as product the triethylamine salt of sulphated lauryl alcohol and sulphated lauric isopropanolamide. The neutral product from stage 4 contained 92.5% of detergent active matter and 1.72% of free oil.

EXAMPLES 12–15

A batch reaction was charged with sulphatable raw material and amino compound, the nature and relative proportions of which are shown in Table II. The charge was agitated vigorously and sulphur trioxide, in the form of a 5 vol. percent mixture with dry air introduced through a sparge pipe into the reaction vessel. The period of introduction of $SO_3$ and the amount used relative to the sulphatable raw material is shown in Table II. The tem-

What I claim is:

1. A sulphation process which comprises firstly introducing sulphur trioxide to a sulphatable material selected from the group consisting of (i) primary and secondary saturated and unsaturated aliphatic hydrocarbon alcohols having from 8 to 26 carbon atoms and (ii) condensates of (a) at least one alkylene oxide selected from the group consisting of ethylene oxide and propylene oxide with (b) a compound selected from the group consisting of alkylphenols and saturated and unsaturated aliphatic hydrocarbon alcohols having from 8 to 26 carbon atoms whereby a partially sulphated product results, and secondly introducing an amino compound selected from the group consisting of primary, secondary and tertiary alkyl amines containing 1–3 carbon atoms in each alkyl group, pyridine and morpholine which reacts with the partially sulphated product and continuing the introduction of sulphur trioxide in the presence of the product formed by the reaction of said amino compound with the sulphated alcohol, the total amount of sulphur trioxide employed being not more than 130% of the stoichiometric amount required to react with the alcohol; said process being carried out at a temperature between 30 and 65° C.

2. A process according to claim 1 wherein said sulphur trioxide is gaseous sulphur trioxide.

3. A process according to claim 1 wherein said sulphur trioxide is dissolved in liquid sulphur dioxide.

4. A process according to claim 1 wherein said amino compound is an alkyl amine.

5. A process according to claim 4 wherein said alcohol is at least one unsaturated alcohol.

6. A process according to claim 5 wherein said alcohol is oleyl alcohol.

7. A process according to claim 5 wherein said alcohol employed is cetyl alcohol.

8. A process according to claim 4 wherein said alcohol is a saturated secondary alcohol.

9. A process according to claim 8 wherein said alcohol has a chain length of 14 to 15 carbon atoms.

10. A process according to claim 4 wherein said alcohol is a saturated primary alcohol.

11. A process according to claim 10 wherein said alcohol is lauryl alcohol.

12. A process according to claim 11 wherein said alcohol is derived from coconut oil.

13. A process according to claim 12 wherein said alcohol is stearyl alcohol.

14. A process according to claim 13 wherein said alcohol is derived from tallow oil.

15. A process according to claim 4 wherein said alcohol is a condensate of from 3 to 6 alkylene oxide groups with an alkyl phenol or saturated or unsaturated alcohol.

16. A process according to claim 15 wherein said alcohol is a condensate of nonyl phenol with 4 molecules of ethylene oxide.

17. A process according to claim 5 wherein sufficient amino compound is provided to react with 40 to 100% of the sulphated alcohol produced.

18. A process according to claim 8 wherein sufficient amino compound is provided to react with 40 to 100% of the sulphated alcohol produced.

References Cited
UNITED STATES PATENTS

| | | | |
|---|---|---|---|
| 3,551,460 | 12/1970 | Sowerby | 260—401 |
| 2,268,443 | 12/1941 | Crowder | 260—459 X |
| 2,854,476 | 9/1958 | Chericek et al. | 260—459 X |

LEON ZITVER, Primary Examiner

L. B. DeCRESCENTE, Assistant Examiner

U.S. Cl. X.R.

260—459

UNITED STATES PATENT OFFICE
CERTIFICATE OF CORRECTION

Patent No. 3,763,208                          Dated October 2, 1973

Inventor(s) A. E. SOWERBY

It is certified that error appears in the above-identified patent and that said Letters Patent are hereby corrected as shown below:

Column 1, line 13, insert --Claims priority, application Great Britain, March 1, 1967, 9,735/67;

July 12, 1967, 32,084/67; October 30, 1967, 49,246/67--

Signed and sealed this 19th day of November 1974.

(SEAL)
Attest:

McCOY M. GIBSON JR.                C. MARSHALL DANN
Attesting Officer                  Commissioner of Patents